United States Patent
Shin

(10) Patent No.: US 10,294,900 B2
(45) Date of Patent: May 21, 2019

(54) SELECTIVE FUEL REGULATOR FOR FUEL TANK THAT STORES DIFFERENT KINDS OF FUEL

(71) Applicants: Hyundai Motor Company, Seoul (KR); Kia Motors Corporation, Seoul (KR)

(72) Inventor: Hyeon Gi Shin, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/828,001

(22) Filed: Nov. 30, 2017

(65) Prior Publication Data

US 2019/0085801 A1    Mar. 21, 2019

(30) Foreign Application Priority Data

Sep. 21, 2017    (KR) ........................ 10-2017-0121583

(51) Int. Cl.
*F02M 37/00*    (2006.01)
*F02D 19/10*    (2006.01)
(Continued)

(52) U.S. Cl.
CPC ......... *F02M 37/0052* (2013.01); *B60K 15/04* (2013.01); *B60K 15/073* (2013.01);
(Continued)

(58) Field of Classification Search
CPC ............... F02M 37/00; F02M 37/0052; F02M 37/0076; F02M 37/0082; F02M 37/008;
(Continued)

(56) References Cited

U.S. PATENT DOCUMENTS

| | | | | |
|---|---|---|---|---|
| 7,222,609 B2* | 5/2007 | Benzin | ............... | F02M 37/0023 123/509 |
| 2002/0005641 A1* | 1/2002 | Imai | ........................ | F16L 39/00 285/316 |
| 2003/0218332 A1* | 11/2003 | Takasaki | .................. | F16L 13/08 285/123.3 |
| 2006/0112937 A1* | 6/2006 | Tittmann | .............. | B60K 15/077 123/510 |
| 2008/0236550 A1* | 10/2008 | Kobayashi | ......... | F02M 37/0052 123/514 |

(Continued)

FOREIGN PATENT DOCUMENTS

| | | |
|---|---|---|
| JP | 2004-019640 A | 1/2004 |
| JP | 2009-243446 A | 10/2009 |

(Continued)

*Primary Examiner* — Hung Q Nguyen
*Assistant Examiner* — Johnny H Hoang
(74) *Attorney, Agent, or Firm* — Mintz Levin Cohn Ferris Glovsky and Popeo, P.C.; Peter F. Corless

(57) ABSTRACT

A selective fuel regulator includes: a fuel tank having therein a cold-area-purpose fuel storage unit and a general-purpose fuel storage unit, a cold-area-purpose fuel pipe connected to the cold-area-purpose fuel storage unit, and a general-purpose fuel pipe connected to the general-purpose fuel storage unit; a body installed in the fuel tank, the body having therein a receiving space; a plurality of pipes, one end of each pipe located in the fuel tank, and the other end of each pipe located in the receiving space in order to supply fuel from the fuel tank to an engine or to collect residual fuel from the engine; a fuel port, one end of the fuel port located in the receiving space, and the other end of the fuel port located outside the body in order to connect the plurality of pipes to a fuel line installed outside the fuel tank; and a connector located between the one end of the fuel port and the respective other ends of the plurality of pipes so as to slide between the cold-area-purpose fuel pipe and the general-purpose fuel pipe for selectively supplying fuel from the (Continued)

cold-area-purpose fuel storage unit or from the general-purpose fuel storage unit to the engine.

20 Claims, 11 Drawing Sheets

(51) Int. Cl.
  *B60K 15/04* (2006.01)
  *B60K 15/073* (2006.01)
  *B60K 15/03* (2006.01)
(52) U.S. Cl.
  CPC .. *F02D 19/105* (2013.01); *B60K 2015/03296* (2013.01); *B60K 2015/03309* (2013.01); *B60K 2015/0474* (2013.01)
(58) Field of Classification Search
  CPC ...... F02M 37/025; F02M 37/10; F02M 55/00; F02M 2037/2288; F02D 19/07; F02D 19/0628; F02D 19/105; B60K 15/04; B60K 15/073; B60K 15/077; B60K 15/03–15/0395; B60K 2015/0777; F28D 2020/0082; F16L 16/06; F16L 21/02; F16L 37/20; F16L 37/48; F16L 37/54; F16L 23/162; F16L 39/00; G01F 15/18; G01F 15/185; F41B 9/0068
  USPC ........................ 123/445, 446, 469, 510, 551
  See application file for complete search history.

(56) References Cited

U.S. PATENT DOCUMENTS

| | | | |
|---|---|---|---|
| 2009/0183715 A1* | 7/2009 | Yamamoto | F02M 37/0082 123/497 |
| 2009/0223492 A1* | 9/2009 | Leppert | F02M 37/0029 123/509 |
| 2011/0001317 A1* | 1/2011 | Chang | A61M 1/008 285/148.2 |
| 2011/0011373 A1* | 1/2011 | Shimura | F02D 41/3082 123/497 |
| 2015/0167597 A1* | 6/2015 | Nagasaku | F02M 25/089 123/520 |

FOREIGN PATENT DOCUMENTS

| | | |
|---|---|---|
| KR | 10-0877851 B1 | 1/2009 |
| KR | 10-0923012 B1 | 10/2009 |

* cited by examiner

SELECTIVE FUEL REGULATOR FOR FUEL TANK THAT STORES DIFFERENT KINDS OF FUEL

CROSS-REFERENCE TO RELATED APPLICATION

This application claims the benefit of priority to Korean Patent Application No. 10-2017-0121583, filed on Sep. 21, 2017 in the Korean Intellectual Property Office, the disclosure of which is incorporated herein by reference in its entirety.

BACKGROUND OF THE DISCLOSURE

1. Technical Field

The present disclosure relates generally to fuel regulators and, more particularly, to a selective fuel regulator for a fuel tank that stores different kinds of fuel.

2. Description of the Related Art

In general, an engine of a vehicle is driven using gasoline or diesel oil while the vehicle is in motion. A diesel vehicle has a problem in that when the diesel vehicle is driven in a cold area using general-purpose diesel oil, which has a freezing point of 0 degrees Celsius, the diesel oil freezes, whereby it is not possible to start the diesel vehicle. For this reason, cold-area-purpose fuel and general-purpose fuel are provided separately. Although cold-area-purpose fuel is relatively expensive, the cold-area-purpose fuel is used only for starting a vehicle, since the cold-area-purpose fuel has a freezing point of minus-35 degrees Celsius. After starting the vehicle, the vehicle is propelled using the general-purpose fuel.

In this case, however, the number of vehicle parts required is increased, complicating the structure of the fuel supply device as well as the entire fuel system, resulting in increased costs.

The matters disclosed in this section are merely for enhancement of understanding of the general background of the disclosure and should not be taken as an acknowledgment or any form of suggestion that the matters form the related art already known to a person skilled in the art.

SUMMARY OF THE DISCLOSURE

Therefore, the present disclosure has been made in view of the above problems, and it is an object of the present disclosure to provide a selective fuel regulator for a fuel tank that stores different kinds of fuel, wherein the selective fuel regulator has a simplified structure and layout based on a reduced number of parts and is capable of selectively supplying cold-area-purpose fuel and general-purpose fuel to an engine with ease.

In accordance with embodiments of the present disclosure, a selective fuel regulator includes: a fuel tank having therein a cold-area-purpose fuel storage unit and a general-purpose fuel storage unit, a cold-area-purpose fuel pipe connected to the cold-area-purpose fuel storage unit, and a general-purpose fuel pipe connected to the general-purpose fuel storage unit; a body installed in the fuel tank, the body having therein a receiving space; a plurality of pipes, one end of each pipe located in the fuel tank, and the other end of each pipe located in the receiving space in order to supply fuel from the fuel tank to an engine or to collect residual fuel from the engine; a fuel port, one end of the fuel port located in the receiving space, and the other end of the fuel port located outside the body in order to connect the plurality of pipes to a fuel line installed outside the fuel tank; and a connector located between the one end of the fuel port and the respective other ends of the plurality of pipes so as to slide between the cold-area-purpose fuel pipe and the general-purpose fuel pipe for selectively supplying fuel from the cold-area-purpose fuel storage unit or from the general-purpose fuel storage unit to the engine.

The cold-area-purpose fuel storage unit and the general-purpose fuel storage unit may be partitioned from each other by a partition.

Through-holes may be formed in an upper side of the partition, the body may be installed in one of the cold-area-purpose fuel storage unit and the general-purpose fuel storage unit, and one or more of the plurality of pipes corresponding to the other of the cold-area-purpose fuel storage unit and the general-purpose fuel storage unit, in which the body is not installed, may extend through the through-holes.

The body may include a lower body, to which the respective other ends of the plurality of pipes is fixed, and an upper body configured to move vertically relative to the lower body while covering the lower body.

A button may be disposed at a side of the lower body for fixing the upper body to the lower body or for separating the upper body from the lower body.

A return elastic member may be disposed on one of the upper body and the lower body for constantly pushing the upper body.

A rotary shaft may be formed at the center of the button so as to function as the center of rotation of the button, a first catching protrusion may be formed at one side of the button, and a rotary elastic member may be provided at the other side of the button. When the rotary elastic member is compressed, the button may rotate about the rotary shaft so as to be spaced apart from the lower body, and the upper body may separate from the lower body due to compression of the return elastic member.

A first catching protrusion may be formed at one side of the button, and a second catching protrusion may be formed at the upper body so as to protrude toward the button. When the first catching protrusion and the second catching protrusion are engaged with each other, the return elastic member may remain compressed, whereby the upper body may be fixed to the lower body in the state in which the upper body is pushed and the distance therebetween may be maintained.

The first catching protrusion and the second catching protrusion may have inclined surfaces, which face each other so as to slide relative to each other. When the upper body is pushed downward, the inclined surface of the first catching protrusion and the inclined surface of the second catching protrusion may slide relative to each other, whereby the upper body may be fixed to the lower body in the state in which the upper body is pushed and the distance therebetween may be maintained.

A volume-variable part may be disposed in the return elastic member so as to be expandable or shrinkable, the volume-variable part expanding to extend the return elastic member, whereby the upper body becomes spaced apart from the lower body.

The volume-variable part may be provided with a control valve for allowing or blocking the injection of air, the control valve causing the volume-variable part to be expandable or shrinkable.

The selective fuel regulator may further include a controller that controls the control valve. When a fuel change switch located in a vehicle is manipulated, the controller may control the control valve so as to operate the volume-variable part.

The upper body may have a shape that covers the lower body and extends further downward than the uppermost end of the lower body, such that the gap between the upper body and the lower body is prevented from being exposed when the upper body moves vertically.

When the upper body and the lower body are spaced apart from each other, a distance between the respective ends of the plurality of pipes and one end of the fuel port may be greater than or equal to a height of the connector.

A pushing member for pushing the return elastic member downward or upward may be formed at the other of the upper body and the lower body, on which the return elastic member is not disposed, a guide member, to which the return elastic member is fixed in an expanded state, may be formed at the one of the upper body and the lower body, on which the return elastic member is disposed, and the return elastic member may be installed so as to be constantly compressed in a direction in which the upper body and the lower body are spaced apart from each other such that the upper body is movable vertically.

An actuation lever for sliding the connector may be installed at the connector so as to extend through the lower body, and a guide slit, in which the actuation lever is movable, may be formed in the lower body, whereby, when the actuation lever is moved in the guide slit, fuel from the cold-area-purpose fuel storage unit or the general-purpose fuel storage unit may be selectively supplied to the engine.

The guide slit may include a plurality of sections provided with a plurality of catching maintenance protrusions for preventing deviation of the actuation lever when the actuation lever moves.

The guide slit may be a closed curve including a plurality of inclined moving sections and a plurality of vertical moving sections such that the actuation lever is movable in the guide slit.

A valve unit may be disposed at one end of the fuel port, the valve unit connected to the connector.

The valve unit may include a pipe-shaped valve body configured such that the sectional area of a middle part of the valve body is smaller than a sectional area of each end of the valve body, valve plates may be disposed on the valve body at opposite ends thereof, and a valve elastic member may be disposed between the valve plates. When the connector is connected to the valve unit, the valve plates may be pushed by the connector, causing the valve plates to push the elastic member, whereby the valve unit is opened and the valve pipes communicate with the fuel port.

The inner diameter of one end of the connector may be greater than or equal to an outer diameter of the respective other ends of the plurality of pipes, and the outer diameter of the other end of the connector may be less than or equal to an inner diameter of the valve unit. The one end of the connector may be inserted into the respective other ends of the plurality of pipes in contact therewith, and the other end of the connector may be inserted into the valve unit in contact therewith, thereby preventing leakage of fuel.

A plurality of fuel holes may be provided at the other end of the connector, which are arranged along an outer circumferential surface of the connector, whereby fuel from the pipes is supplied to the fuel port via the valve unit through the plurality of fuel holes.

BRIEF DESCRIPTION OF THE DRAWINGS

The above and other objects, features and other advantages of the present disclosure will be more clearly understood from the following detailed description taken in conjunction with the accompanying drawings, in which.

Figure 1:
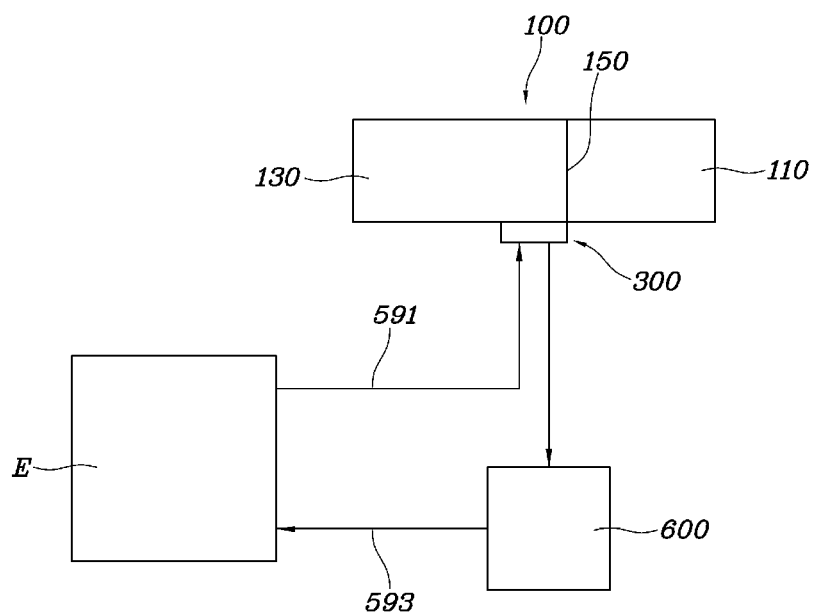
FIG. 1 is a schematic view showing a fuel system equipped with a selective fuel regulator for a fuel tank that stores different kinds of fuel according to embodiments of the present disclosure.
Figure 2:
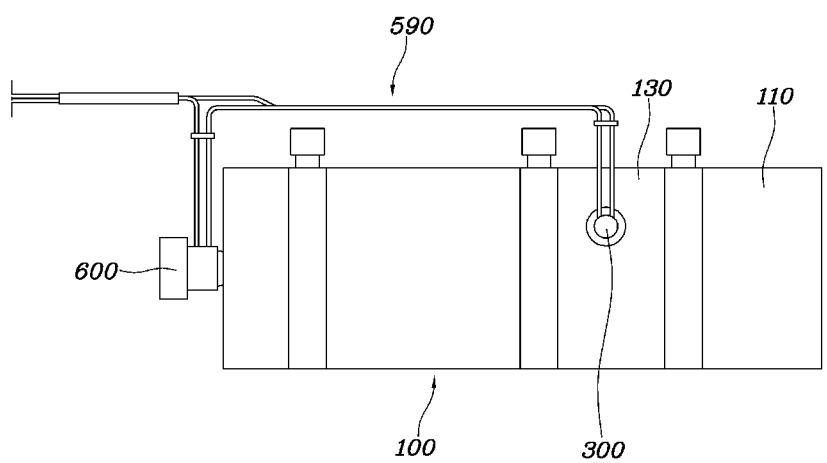
FIG. 2 is a detailed view showing the fuel system equipped with the selective fuel regulator for the fuel tank that stores different kinds of fuel according to embodiments of the present disclosure.
Figure 3:
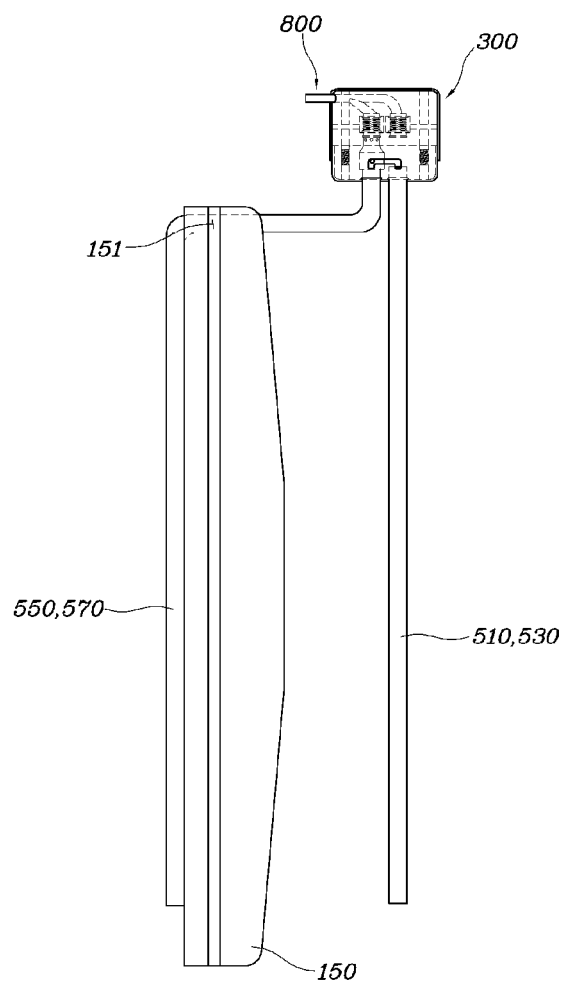
FIG. 3 is a view showing a partition.
Figure 4:
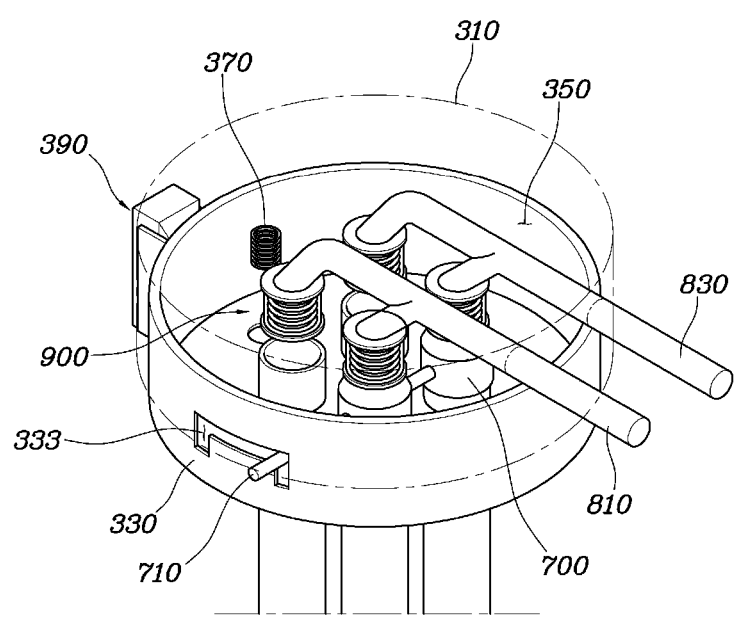
FIG. 4 is a view showing a selective fuel regulator for a fuel tank that stores different kinds of fuel according to a first embodiment of the present disclosure.
Figure 5:
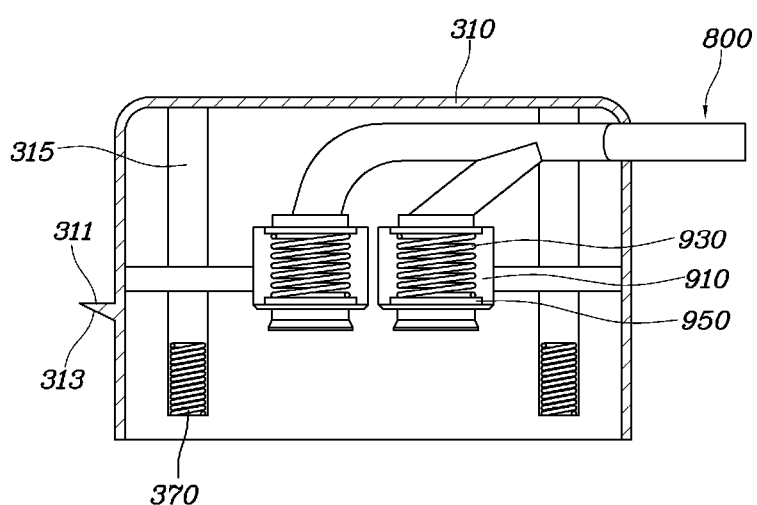
FIG. 5 is a view showing an upper body of FIG. 4.
Figure 6:
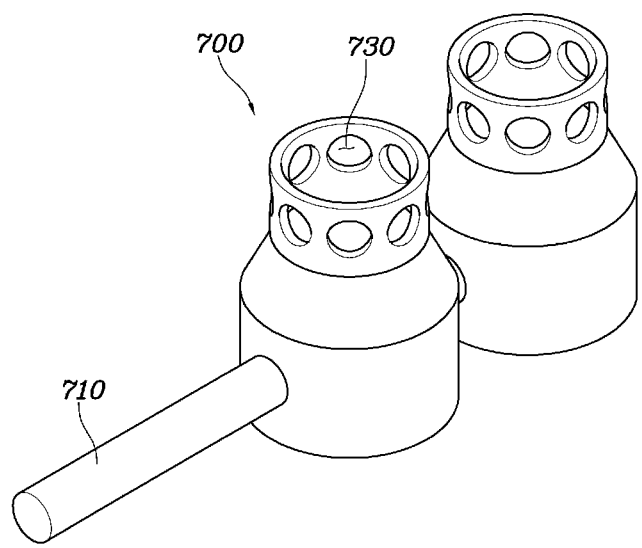
FIG. 6 is a view showing a connector of FIG. 4.
Figure 7:
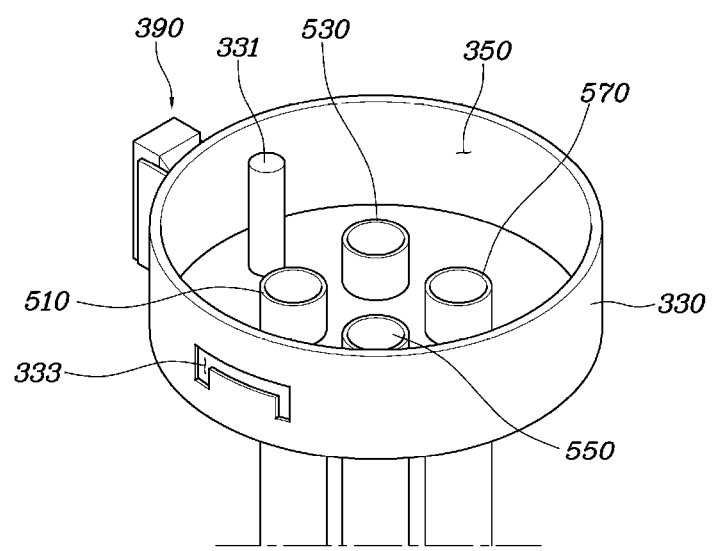
FIG. 7 is a view showing a lower body of FIG. 4.
Figure 8:
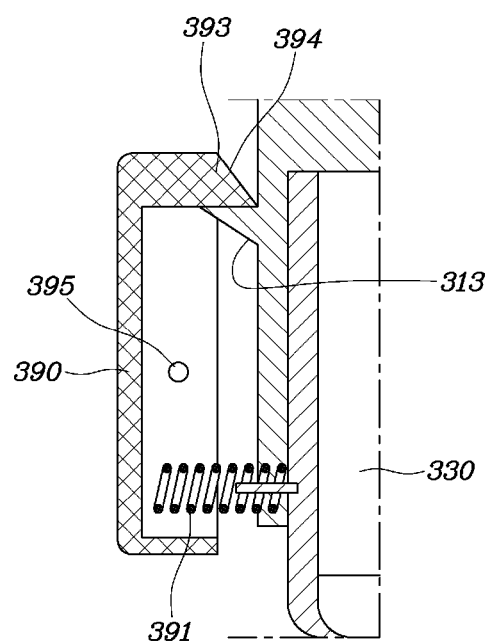
FIG. 8 is a view showing a button of FIG. 4.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of a selective fuel regulator for a fuel tank that stores different kinds of fuel according to the present disclosure will be described with reference to the accompanying drawings.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to embodiments of the present disclosure, a selective fuel regulator for a fuel tank that stores different kinds of fuel according to a first embodiment of the present disclosure is installed in a fuel tank 100 having therein a cold-area-purpose fuel storage unit 110 and a general-purpose fuel storage unit 130. The selective fuel regulator includes a body 300 installed in the fuel tank 100, the body 300 having therein a receiving space 350, a plurality of pipes 500, one end of each of which is located in the fuel tank 100 and the other end of each of which is located in the receiving space 350 in order to supply fuel from the fuel tank 100 to an engine E or to collect residual fuel from the engine to the fuel tank 100, a fuel port 800, one end of which is located in the receiving space 350 and the other end of which is located outside the body 300 in order to connect the pipes 500 to a fuel line 590 installed outside the fuel tank 100, and a connector 700 located between one end of the fuel port 800 and the other end of the pipes 500 so as to slide between a cold-area-purpose fuel pipe and a general-purpose fuel pipe for selectively supplying fuel from the cold-area-purpose fuel storage unit 110 or from the general-purpose fuel storage unit 130 to the engine.

The cold-area-purpose fuel storage unit 110 and the general-purpose fuel storage unit 130 are provided in the fuel tank 100. In general, cold-area-purpose fuel is fuel having a freezing point of minus-35 degrees Celsius, which does not cause a starting problem due to freezing of fuel in cold areas. However, the cold-area-purpose fuel is relatively expensive compared to general-purpose fuel, which has a freezing point of 0 Degrees Celsius. In addition, when the engine E is driven at a normal temperature after being started, the general-purpose fuel, rather than the cold-area-purpose fuel, is used. For this reason, the general-purpose fuel storage unit 130 may be larger than the cold-area-purpose fuel storage unit 110. The cold-area-purpose fuel storage unit 110 and the general-purpose fuel storage unit 130 are partitioned from each other by the partition 150.

The body 300 is installed in the fuel tank 100. The body 300 may be installed at the upper side of the fuel tank 100 in the direction of gravity. A fuel-level sensor (not shown) for sensing the level of fuel is provided in each pipe 50. The fuel-level sensor may be a general magnetic floater-type sensor. In order for the fuel-level sensor to easily and accurately detect the level of fuel in the fuel tank 100, therefore, the pipes 500 may be installed vertically in the direction of gravity. In particular, the body 300 is installed in either the cold-area-purpose fuel storage unit 110 or the general-purpose fuel storage unit 130. In this specification, the body 300 is described and shown as being installed in the general-purpose fuel storage unit 130. However, the present disclosure is not limited thereto. The structure of the body 300 will be described in more detail below.

Through-holes 151 are formed in the upper side of the partition 150. The body 300 is installed in one of the cold-area-purpose fuel storage unit 110 and the general-purpose fuel storage unit 130, and some (i.e., one or more) of the pipes 500 corresponding to the other fuel storage unit, in which the body 300 is not installed, extend through the through-holes 151. In this specification, the body 300 is shown and described as being installed in the general-purpose fuel storage unit 130, and cold-area-purpose fuel pipes 550 and 570 are shown and described as extending through the through-holes 151 and being installed in the cold-area-purpose fuel storage unit 110. However, the present disclosure is not limited thereto. The fuel tank 100 is provided at the upper side thereof with an expansion volume part, which is filled with air in consideration of the expansion of fuel. The pipes 500 are connected to the fuel tank 100 through the expansion volume part of the fuel tank 100, whereby airtightness is achieved.

One end of each of the pipes 500 is located in the fuel tank 100, and the other end of each of the pipes 500 is located in the receiving space 360 in order to supply fuel from the fuel tank 100 to the engine E or to collect residual fuel from the engine E to the fuel tank 100. The pipes 500 include a general-purpose fuel supply pipe 510 and a general-purpose fuel collection pipe 530, which communicate with the general-purpose fuel storage unit 130, and a cold-area-purpose fuel supply pipe 550 and a cold-area-purpose fuel collection pipe 570, which communicate with the general-purpose fuel storage unit 130.

One end of the fuel port 800 is located in the receiving space 350 and the other end of the fuel port 800 is located outside the body 300 in order to connect the pipes to the fuel line 590, which is installed outside the fuel tank 100. The fuel line 590 includes a fuel supply line 591 and a fuel collection line 593. A fuel filter 600 may be provided between the fuel supply line 591 and the engine E. In addition, the fuel port 800 includes a fuel supply port 810 for supplying fuel from the fuel tank 100 to the engine E and a fuel collection port 830 for supplying residual fuel from the engine E to the fuel tank 100. In order to supply fuel from the fuel tank 100 to the engine E, the fuel port 800 is simultaneously connected to the general-purpose fuel supply pipe 510 and the cold-area-purpose fuel supply pipe 550. In order to supply residual fuel from the engine E to the fuel tank 100, the fuel port 800 is simultaneously connected to the general-purpose fuel collection pipe 530 and the cold-area-purpose fuel collection pipe 570. However, one of the general-purpose fuel pipe and the cold-area-purpose fuel pipe is connected by the connector 700, but the other is not connected thereby.

The connector 700 is located between one end of the fuel port 800 and the other end of the pipes 500 so as to slide between the cold-area-purpose fuel pipe and the general-purpose fuel pipe. Consequently, fuel from the cold-area-purpose fuel storage unit 110 or the general-purpose fuel storage unit 130 may be selectively supplied to the engine E. The connector 700 will be described in detail below.

The receiving space 350 is provided in the body 300. The body 300 includes a lower body 330, to which the other end of each of the pipes 500 is fixed, and an upper body 310 configured to move vertically relative to the lower body 300 while covering the lower body 300. The present disclosure will be described with reference to a first embodiment of manually controlling the connector 700 and a second embodiment of automatically controlling the connector 700 by manipulating a fuel change switch 200 located in a vehicle.

In the first embodiment of manually controlling the connector 700, a button 390 is formed at the side of the lower body 330 so as to fix the upper body 310 and the lower body 330 to each other or to separate the upper body 310 and the lower body 330 from each other, and a return elastic member 370 for constantly pushing the upper body 310 is provided at the upper body 310 or the lower body 330. The upper body 310 has a shape that covers the lower body 330 and extends further downward than the uppermost end of the lower body 330 such that the gap between the upper body 310 and the lower body 330 is prevented from being exposed when the upper body 310 moves vertically. Consequently, airtightness of the body 300 is achieved. In this specification, the return elastic member 370 is shown and described as being provided at the upper body 310.

The button 390 includes a rotary shaft 395 formed at the center of the button 390 so as to function as the center of rotation of the button 390, a first catching protrusion 393 formed at one side of the button 390 so as to extend to the body 300, and a rotary elastic member 391 provided at the other side of the button 390 so as to provide elastic force. A second catching protrusion 311 is formed at the portion of the upper body 310 corresponding to the first catching protrusion 393 so as to protrude toward the button 390. When the first catching protrusion 393 and the second catching protrusion 311 are engaged with each other, the return elastic member 370 remains compressed, with the result that the upper body 310 is fixed to the lower body 330 in a pushed state, whereby the distance therebetween is maintained. When the other side of the button 390 is pushed, the button 390 is rotated about the rotary shaft 395 so as to be spaced apart from the lower body 330 and is then returned to the original position thereof by the rotary elastic member 391. Consequently, the fixing between the upper body 310 and the lower body 330 is released due to the compression of the return elastic member 370, with the result that the upper body 310 is pushed upward by the return elastic member 370.

Figure 9:
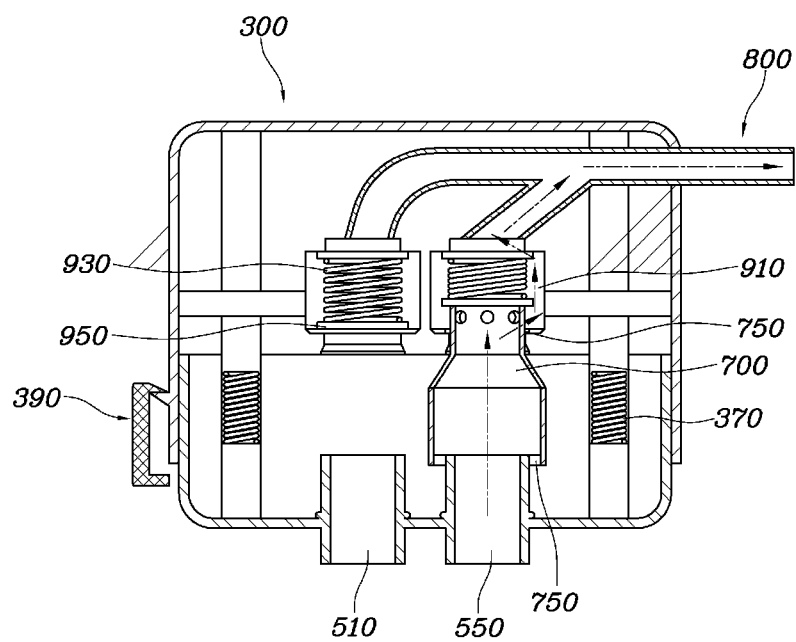
FIGS. 9 and 10 are views showing the connection of the connector.
Figure 10:
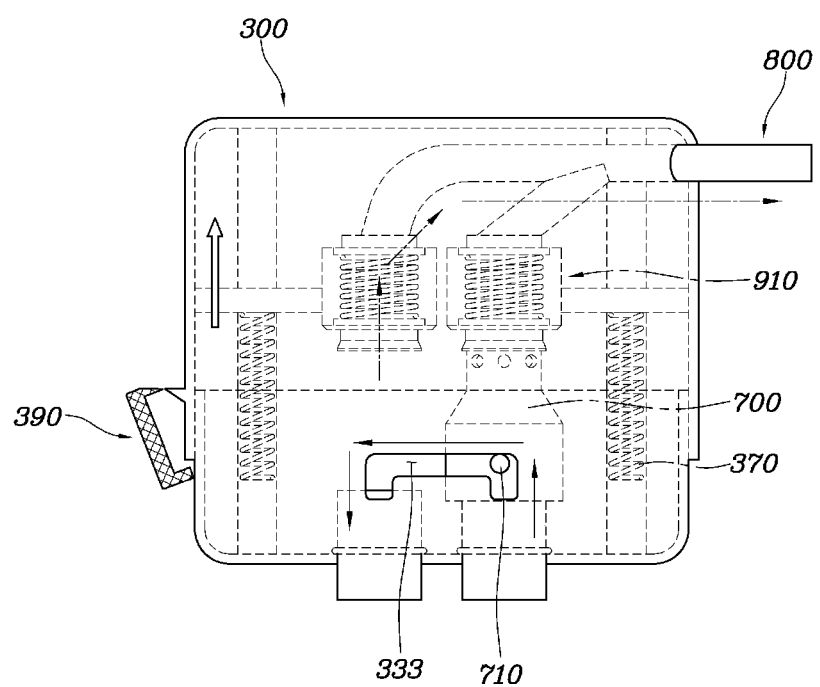
Figure 11:
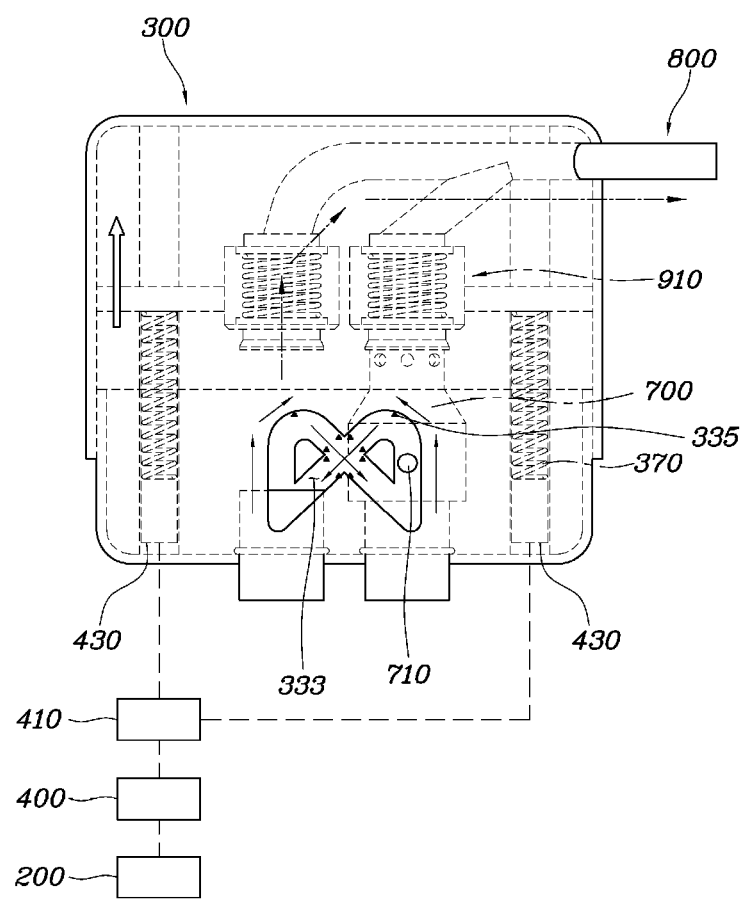
FIG. 11 is a view showing a selective fuel regulator for a fuel tank that stores different kinds of fuel according to a second embodiment of the present disclosure.

In particular, the first catching protrusion 393 and the second catching protrusion 311 have inclined surfaces 394 and 313, which face each other so as to slide relative to each other. When the upper body 310 is pushed downward, therefore, the inclined surface 394 of the first catching protrusion 393 and the inclined surface 313 of the second catching protrusion 311 may slide relative to each other. As a result, the upper body 310 is fixed to the lower body 330 in a pushed state, whereby the distance therebetween is maintained. The details thereof are shown in FIGS. 9 and 10.

In particular, the distance between the end of each of the pipes 500 and one end of the fuel port 800 when the upper body 310 and the lower body 330 are spaced apart from each other may be greater than or equal to the overall height of the connector 700. Consequently, the connector 700 may easily slide between each of the general-purpose fuel pipes 510 and 530 and a corresponding one of the cold-area-purpose fuel pipes 550 and 570.

A pushing member 315 for pushing the return elastic member 370 downward or upward is formed at the other of the upper body 310 and the lower body 330 at which the return elastic member 370 is not provided. A guide member 331, to which the return elastic member 370 is fixed in an expanded state, is formed at one of the upper body 310 and the lower body 330 at which the return elastic member 370 is provided. In this specification, the pushing member 315 is formed at the lower body 330 in order to push the return elastic member 370 when the upper body 310 is pushed downward, and the guide member 331, to which the return elastic member 370 is fixed so as not to expand further, is formed at the upper body 310. Consequently, the return elastic member 370 is installed so as to be compressed in the direction in which the upper body 310 and the lower body 330 are spaced apart from each other, whereby the upper body 310 may move vertically by the distance that the return elastic member 370 is compressed and expanded.

An actuation lever 710 for sliding the connector 700 extends through the lower body 330. A guide slit 333, in which the actuation lever 710 is movable, is formed in a portion of the lower body 330 corresponding to the actuation lever 710. When the actuation lever 710 is moved in the guide slit 333, therefore, the actuation lever 710 is selectively connected to the cold-area-purpose fuel pipe or the general-purpose fuel pipe, whereby fuel from the cold-area-purpose fuel storage unit 110 or the general-purpose fuel storage unit 130 is selectively supplied to the engine E. The actuation lever 710 may be manipulated manually.

In addition, a valve unit 900, which is connected to the connector 700, is provided at one end of the fuel port 800. The valve unit 900 includes a pipe-shaped valve body 910 configured such that the sectional area of the middle thereof is smaller than that of each end thereof, valve plates 950 provided in the valve body 910 at the opposite ends thereof, and a valve elastic member 930 disposed between the valve plates 950. When the connector 700 is connected to the valve unit 900, the valve plates 950 are pushed by the connector 700 and thus push the elastic member. As a result, the valve unit 900 is opened, whereby the pipes 500 communicate with the fuel port 800. In particular, the inner diameter of one end of the connector 700 is greater than or equal to the outer diameter of the other end of each of the pipes 500, and the outer diameter of the other end of the connector 700 is less than or equal to the inner diameter of the valve unit 900. Consequently, one end of the connector 700 is inserted into the other end of each of the pipes 500 in tight contact therewith, and the other end of the connector 700 is inserted into the valve unit 900 in tight contact therewith, whereby the leakage of fuel is prevented. In addition, sealing members 750 are provided between one end of the connector 700 and the other end of each of the pipes 500 and between the other end of the connector 700 and the valve unit 900 in order to more securely achieve airtightness between the pipes 500, the connector 700, and the valve unit 900.

The connector 700 is provided at the other end thereof with a plurality of fuel holes 730, which are arranged along the outer circumferential surface of the connector 700. Fuel from the pipes 500 flows through the fuel holes 730, is supplied to the fuel port 800 via the valve unit 900, and is connected to the fuel line 590, which is connected to the engine E.

In particular, in the first embodiment of the present disclosure, the valve elastic member 930 of the valve unit 900 has a coefficient of elasticity that is greater than fuel supply pressure and is less than manual force. In general, fuel supply pressure is about 3 kg/cm$^2$. Consequently, it is possible to select a coefficient of elasticity such that the valve elastic member of the valve unit is not operated at the fuel supply pressure but is operated manually. When a user moves the connector 700 and pushes the upper body 310 in order to connect the connector 700 to the valve unit 900, therefore, the valve unit 900 may be opened. However, the valve unit 900 is not opened merely by the fuel supply pressure. Consequently, it is possible to prevent undesired supply of fuel or the introduction of collected fuel to the supply side.

The operation of the first embodiment of the present invention will be described with reference to FIGS. 9 and 10.

First, on the assumption that the connector 700 is connected to the cold-area-purpose fuel pipes 550 and 570, a line is formed by the cold-area-purpose fuel storage unit 110—the cold-area-purpose fuel supply pipe 550—the fuel supply port 810—the engine E, and a line is formed by the engine E—the fuel collection port 830—the cold-area-purpose fuel collection pipe 570—the cold-area-purpose fuel storage unit 110, as shown in FIG. 9. On the assumption that cold-area-purpose fuel is supplied to the engine E, therefore, fuel from the cold-area-purpose fuel storage unit 110 is supplied to the engine E via the cold-area-purpose fuel supply pipe 550, the connector 700, the valve unit 900, the fuel supply port 810, and the fuel line 590. In the case in which fuel is collected, fuel flows from the engine E to the cold-area-purpose fuel storage unit 110 via the fuel line 590, the fuel collection port 830, and the cold-area-purpose fuel collection pipe 570.

In order to supply general-purpose fuel to the engine E in this state, the other side of the button 390 is pushed to rotate the button 390. As a result, the upper body 310 is moved upward by the return elastic member 370 such that the connector 700 is slidable. When the actuation lever is manipulated along the guide slit 333, the connector 700 moves from the cold-area-purpose fuel pipes 550 and 570 to the general-purpose fuel pipes 510 and 530, and is connected to the general-purpose fuel pipes 510 and 530. At this time, when the upper body 310 is pushed toward the lower body 330, the return elastic member 370 is compressed, and the inclined surface 394 of the first catching protrusion 393 and the inclined surface 313 of the second catching protrusion 311 slide relative to each other. As a result, the button 390 fixes the upper body 310 and the lower body 330 in the state in which the return elastic member 370 is compressed. Consequently, the general-purpose fuel pipes 510 and 530, the connector 700, the valve unit 900, and the fuel port 800 are connected to each other.

In the same manner as in the above description, a line is formed by the general-purpose fuel storage unit 130—the general-purpose fuel supply pipe 510—the fuel supply port 810—the engine E, and a line is formed by the engine E—the fuel collection port 830—the general-purpose fuel collection pipe 530—the general-purpose fuel storage unit 130, as shown in FIG. 10. On the assumption that general-purpose fuel is supplied to the engine E, therefore, fuel from the general-purpose fuel storage unit 130 is supplied to the engine E via the general-purpose fuel supply pipe 510, the connector 700, the valve unit 900, the fuel supply port 810, and the fuel line 590. In the case in which fuel is collected, fuel flows from the engine E to the general-purpose fuel storage unit 130 via the fuel line 590, the fuel collection port 830, and the general-purpose fuel collection pipe 530.

That is, a user may supply any one of general-purpose fuel and cold-area-purpose fuel to the engine E using the above method. In a practical example, when the vehicle is started or initially travels, fuel is supplied from the cold-area-purpose fuel storage unit 110, in which cold-area-purpose fuel having a low freezing point is stored. During the normal travel of the vehicle, the type of fuel to be supplied is switched, and general-purpose fuel is supplied from the general-purpose fuel storage unit 130, since the fuel tank 100 is heated. Even when the type of fuel to be supplied is switched, the portion of the fuel port 800 that is not connected to the connector 700 is closed by the valve unit 900, whereby the leakage of fuel is prevented.

In the second embodiment of the present disclosure, a user manipulates the fuel change switch provided in the vehicle. As a result, the upper body 310, the lower body 330, and the connector 700 are operated by a controller 400 and an actuator in order to selectively use the fuel in the cold-area-purpose fuel storage unit or the fuel in the general-purpose fuel storage unit. In the second embodiment, therefore, the button 390 used in the first embodiment is omitted.

In the second embodiment, the controller 400, which is connected to the fuel change switch 200 provided in the vehicle, is provided. The controller 400 is connected to a control valve 410, which is an example of the actuator. The control valve 410 is connected to a volume-variable part 430 provided in the return elastic member 370 so as to be expandable or shrinkable. When the user manipulates the fuel change switch 200, therefore, the controller 400 controls the control valve 410 such that the volume-variable part 430 expands to extend the return elastic member 370, whereby the upper body 310 becomes spaced apart from the lower body 330. Air may be injected into the volume-variable part 430 in order to expand the volume-variable part 430.

In addition, when the volume-variable part 430 expands or shrinks under the control of the controller 400, the actuation lever 710 of the connector 700 moves along the guide slit 333 to switch between the cold-area-purpose fuel supply pipe 550 and the cold-area-purpose fuel collection pipe 570 and the general-purpose fuel supply pipe 510 and the general-purpose fuel collection pipe 530. The guide slit 333 may be a closed curve including a plurality of inclined moving sections and a plurality of vertical moving sections so as to be formed in a butterfly shape or an infinity symbol shape. When the volume-variable part 430 is operated by the control valve 410, therefore, the actuation lever 710 moves in the guide slit 333 to perform the fuel change switching operation. In addition, catching maintenance protrusions 335 are formed in the guide slit 333 at the moving sections thereof to prevent the deviation of the actuation lever 710 when the actuation lever 710 moves.

In the second embodiment, therefore, when the user manipulates the fuel change switch 200 in order to switch from cold-area-purpose fuel to general-purpose fuel, the controller 400 transmits a signal to the control valve 410. As a result, air is introduced into the volume-variable part 430 through the control valve 410, whereby the volume-variable part 430 expands. Consequently, the upper body 310 moves upward simultaneously with the connector 700, whereby the connection between the connector 700 and the cold-area-purpose fuel supply pipe 550 and the cold-area-purpose fuel collection pipe 570 is released. At this time, when air is discharged from the volume-variable part 430 through the control valve 410 under the control of the controller 400 with the result that the volume-variable part 430 shrinks, the upper body 310 and the connector 700 move downward along the guide slit 333, whereby the connector 700 is connected to the general-purpose fuel supply pipe 510 and the general-purpose fuel collection pipe 530 such that the vehicle is driven using general-purpose fuel.

In order to prevent freezing of fuel at the time of next starting a predetermined time before the starting is stopped after driving of the vehicle, the operation is performed through a process that is reverse to the above process in order to switch from general-purpose fuel to cold-area-purpose fuel through the movement of the connector 700.

As is apparent from the above description, the selective fuel regulator for the fuel tank that stores different kinds of fuel has the effects of reducing the number of parts, selectively using different kinds of fuel through a simplified structure based on the reduction in number of parts, simplifying the layout of the entire fuel system, and reducing manufacturing costs by obviating separate mounting brackets.

Although certain embodiments of the present disclosure have been described above with reference to the accompanying drawings, those skilled in the art will appreciate that the present disclosure can be implemented in various other embodiments without changing the technical ideas or features thereof.

What is claimed is:

1. A selective fuel regulator comprising:
    a fuel tank having therein a cold-area-purpose fuel storage unit used when a vehicle is started in a cold area and a general-purpose fuel storage unit used when the vehicle generally drives in motion, a cold-area-purpose fuel pipe connected to the cold-area-purpose fuel storage unit, and a general-purpose fuel pipe connected to the general-purpose fuel storage unit;
    a body installed in the fuel tank, the body having therein a receiving space;
    a plurality of pipes, one end of each pipe located in the fuel tank, and the other end of each pipe located in the receiving space in order to supply fuel from the fuel tank to an engine or to collect residual fuel from the engine;
    a fuel port, one end of the fuel port located in the receiving space, and the other end of the fuel port located outside the body in order to connect the plurality of pipes to a fuel line installed outside the fuel tank; and
    a connector located between the one end of the fuel port and the respective other ends of the plurality of pipes so as to slide between the cold-area-purpose fuel pipe and the general-purpose fuel pipe for selectively supplying fuel from the cold-area-purpose fuel storage unit or from the general-purpose fuel storage unit to the engine.

2. The selective fuel regulator according to claim 1, wherein the cold-area-purpose fuel storage unit and the general-purpose fuel storage unit are partitioned from each other by a partition.

3. The selective fuel regulator according to claim 2, wherein:
    through-holes are formed in an upper side of the partition,
    the body is installed in one of the cold-area-purpose fuel storage unit and the general-purpose fuel storage unit, and
    one or more of the plurality of pipes corresponding to the other of the cold-area-purpose fuel storage unit and the general-purpose fuel storage unit, in which the body is not installed, extend through the through-holes.

4. The selective fuel regulator according to claim 1, wherein the body comprises a lower body, to which the respective other ends of the plurality of pipes is fixed, and an upper body configured to move vertically relative to the lower body while covering the lower body.

5. The selective fuel regulator according to claim 4, wherein a button is disposed at a side of the lower body for fixing the upper body to the lower body or for separating the upper body from the lower body, and
    wherein a return elastic member is disposed on one of the upper body and the lower body for constantly pushing the upper body.

6. The selective fuel regulator according to claim 5, wherein:
    a rotary shaft is formed at a center of the button so as to function as a center of rotation of the button,
    a first catching protrusion is formed at one side of the button,
    a rotary elastic member is provided at the other side of the button, and
    when the rotary elastic member is compressed, the button rotates about the rotary shaft so as to be spaced apart from the lower body, and the upper body separates from the lower body due to compression of the return elastic member.

7. The selective fuel regulator according to claim 5, wherein:
    a first catching protrusion is formed at one side of the button,
    a second catching protrusion is formed at the upper body so as to protrude toward the button, and
    when the first catching protrusion and the second catching protrusion are engaged with each other, the return elastic member remains compressed, whereby the upper body is fixed to the lower body in a state in which the upper body is pushed and a distance therebetween is maintained.

8. The selective fuel regulator according to claim 7, wherein:
    the first catching protrusion and the second catching protrusion have inclined surfaces, which face each other so as to slide relative to each other, and
    when the upper body is pushed downward, the inclined surface of the first catching protrusion and the inclined surface of the second catching protrusion slide relative to each other, whereby the upper body is fixed to the lower body in a state in which the upper body is pushed and a distance therebetween is maintained.

9. The selective fuel regulator according to claim 5, wherein a volume-variable part is disposed in the return elastic member so as to be expandable or shrinkable, the volume-variable part expanding to extend the return elastic member, whereby the upper body becomes spaced apart from the lower body, and
    wherein the volume-variable part is provided with a control valve for allowing or blocking injection of air, the control valve causing the volume-variable part to be expandable or shrinkable.

10. The selective fuel regulator according to claim 9, further comprising:
    a controller that controls the control valve,
    wherein, when a fuel change switch located in a vehicle is manipulated, the controller controls the control valve so as to operate the volume-variable part.

11. The selective fuel regulator according to claim 4, wherein the upper body has a shape that covers the lower body and extends further downward than an uppermost end of the lower body, such that a gap between the upper body and the lower body is prevented from being exposed when the upper body moves vertically.

12. The selective fuel regulator according to claim 4, wherein, when the upper body and the lower body are spaced apart from each other, a distance between the respective ends of the plurality of pipes and one end of the fuel port is greater than or equal to a height of the connector.

13. The selective fuel regulator according to claim 5, wherein:
- a pushing member for pushing the return elastic member downward or upward is formed at the other of the upper body and the lower body, on which the return elastic member is not disposed,
- a guide member, to which the return elastic member is fixed in an expanded state, is formed at the one of the upper body and the lower body, on which the return elastic member is disposed, and
- the return elastic member is installed so as to be constantly compressed in a direction in which the upper body and the lower body are spaced apart from each other such that the upper body is movable vertically.

14. The selective fuel regulator according to claim 4, wherein:
- an actuation lever for sliding the connector is installed at the connector so as to extend through the lower body, and
- a guide slit, in which the actuation lever is movable, is formed in the lower body, whereby, when the actuation lever is moved in the guide slit, fuel from the cold-area-purpose fuel storage unit or the general-purpose fuel storage unit is selectively supplied to the engine.

15. The selective fuel regulator according to claim 14, wherein the guide slit includes a plurality of sections provided with a plurality of catching maintenance protrusions for preventing deviation of the actuation lever when the actuation lever moves.

16. The selective fuel regulator according to claim 14, wherein the guide slit is a closed curve comprising a plurality of inclined moving sections and a plurality of vertical moving sections such that the actuation lever is movable in the guide slit.

17. The selective fuel regulator according to claim 1, wherein a valve unit is disposed at one end of the fuel port, the valve unit connected to the connector.

18. The selective fuel regulator according to claim 17, wherein:
- the valve unit comprises a pipe-shaped valve body configured such that a sectional area of a middle part of the valve body is smaller than a sectional area of each end of the valve body,
- valve plates are disposed on the valve body at opposite ends thereof,
- a valve elastic member is disposed between the valve plates, and
- when the connector is connected to the valve unit, the valve plates are pushed by the connector, causing the valve plates to push the elastic member, whereby the valve unit is opened and the valve pipes communicate with the fuel port.

19. The selective fuel regulator according to claim 17, wherein:
- an inner diameter of one end of the connector is greater than or equal to an outer diameter of the respective other ends of the plurality of pipes,
- an outer diameter of the other end of the connector is less than or equal to an inner diameter of the valve unit,
- the one end of the connector is inserted into the respective other ends of the plurality of pipes in contact therewith, and
- the other end of the connector is inserted into the valve unit in contact therewith, thereby preventing leakage of fuel.

20. The selective fuel regulator according to claim 17, wherein a plurality of fuel holes are provided at the other end of the connector, which are arranged along an outer circumferential surface of the connector, whereby fuel from the pipes is supplied to the fuel port via the valve unit through the plurality of fuel holes.

* * * * *